United States Patent [19]
Crawford et al.

[11] Patent Number: 6,087,811
[45] Date of Patent: Jul. 11, 2000

[54] PULSED-OUTPUT POWER SUPPLY WITH HIGH POWER FACTOR

[75] Inventors: Ian D. Crawford, Longwood; Charles G. Smith, Lake Mary; John P. Sullivan, Casselberry, all of Fla.

[73] Assignee: Analog Modules, Inc., Longwood, Fla.

[21] Appl. No.: 09/208,566

[22] Filed: Dec. 9, 1998

[51] Int. Cl.[7] .................................................. H02J 7/16
[52] U.S. Cl. ........................................ 320/139; 320/137
[58] Field of Search .................................. 320/139, 166, 320/137, 129, 128, 127

[56] References Cited

U.S. PATENT DOCUMENTS

| | | | |
|---|---|---|---|
| 3,579,074 | 5/1971 | Richell | 320/166 |
| 3,654,537 | 4/1972 | Coffey | 320/166 |
| 3,678,362 | 7/1972 | Amberger et al. | 320/166 |
| 3,944,904 | 3/1976 | Hase | 320/146 |
| 4,314,198 | 2/1982 | Rogers | 323/351 |
| 4,536,693 | 8/1985 | Marek | 320/166 |
| 4,616,167 | 10/1986 | Adler | 320/166 |
| 4,725,735 | 2/1988 | Ariel et al. | 250/386 |
| 4,849,681 | 7/1989 | Munning Schmidt et al. | 320/133 |
| 5,184,059 | 2/1993 | Patino et al. | 320/125 |
| 5,204,610 | 4/1993 | Pierson et al. | 320/126 |
| 5,331,269 | 7/1994 | Armond et al. | 320/164 |
| 5,349,282 | 9/1994 | McClure | 320/136 |
| 5,407,444 | 4/1995 | Kroll | 607/5 |
| 5,461,297 | 10/1995 | Crawford | 320/166 |
| 5,483,142 | 1/1996 | Skibinski et al. | 320/166 |
| 5,499,234 | 3/1996 | Rider et al. | 320/132 |
| 5,502,629 | 3/1996 | Ito et al. | 363/60 |
| 5,532,572 | 7/1996 | Okamura | 320/166 |
| 5,568,035 | 10/1996 | Kato et al. | 320/166 |
| 5,572,107 | 11/1996 | Koch et al. | 320/166 |
| 5,572,735 | 11/1996 | Tanikawa | 320/166 |
| 5,604,426 | 2/1997 | Okamura et al. | 323/282 |
| 5,619,115 | 4/1997 | Kajita | 320/166 |
| 5,621,255 | 4/1997 | Leon et al. | 307/106 |
| 5,642,027 | 6/1997 | Windes et al. | 320/166 |
| 5,648,714 | 7/1997 | Eryou et al. | 320/139 |
| 5,680,031 | 10/1997 | Pavlovic et al. | 320/145 |
| 5,686,813 | 11/1997 | Huen et al. | 320/103 |
| 5,714,863 | 2/1998 | Hwang et al. | 320/166 |
| 5,726,552 | 3/1998 | Okamura | 320/126 |

*Primary Examiner*—Adolf Deneke Berhane
*Assistant Examiner*—Lawrence Luk
*Attorney, Agent, or Firm*—Gerald E. Linden

[57] ABSTRACT

A pulsed-output power supply having a high input power factor. The rate at which energy is transferred from a power supply unit (PSU) to an energy storage element such as a capacitor is monitored and adjusted such that the charging rate substantially matches the time interval between output pulses. In this manner, input power to the PSU is smoothed to a substantially constant level, thereby eliminating input power surges traditionally associated with pulsed-output power supplies and providing a high input power factor (PF). In an embodiment of the invention, energy transfer from the PSU to the capacitor is sensed by a current sensor. The period of current flow to the capacitor is compared to the historical or predicted period between capacitor discharge pulses. The rate of energy transfer from the power supply is automatically adjusted to make these two periods approximately equal. The energy required to charge the capacitor is spread over the time available to minimize the peak current draw from the power source, thus improving the measured power factor.

18 Claims, 2 Drawing Sheets

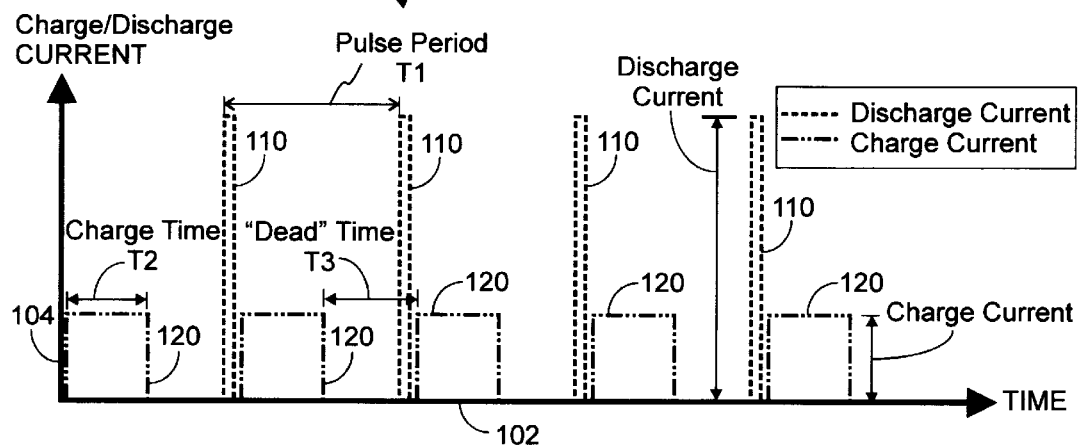
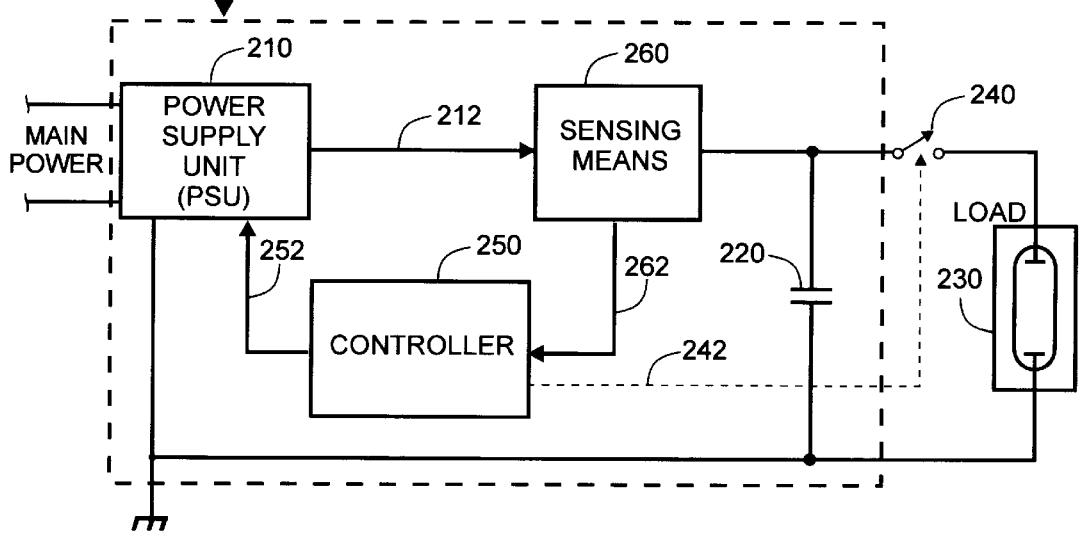

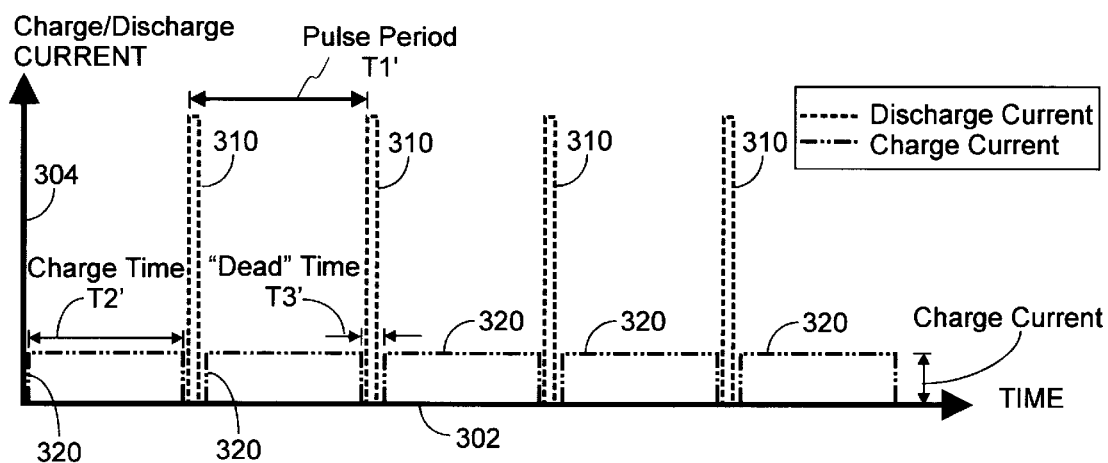
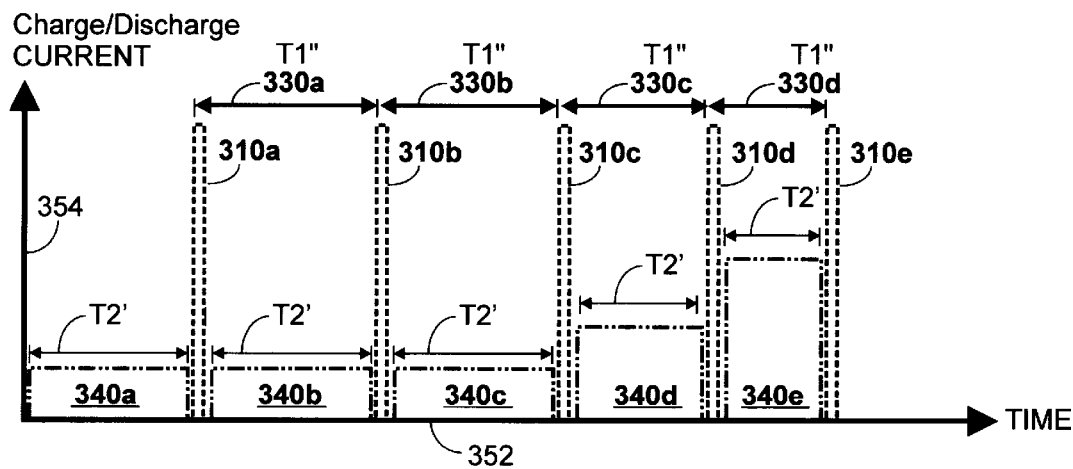

PULSED-OUTPUT POWER SUPPLY WITH HIGH POWER FACTOR

TECHNICAL FIELD OF THE INVENTION

The invention relates to power supplies and, more particularly to pulsed-output power supplies having a power supply unit (PSU) charging a storage capacitor which is discharged periodically into an intermittent load, such as a pulsed flash lamp in a laser system.

BACKGROUND OF THE INVENTION

Many modern systems utilize power in a pulsed delivery mode, repeatedly supplying energy to an energy storage element, typically charging a storage capacitor, and rapidly delivering the stored energy into a load. For example, medical lasers operate by delivering optical energy in a rapid-fire series of short laser bursts. These bursts are generated by rapidly discharging an energy storage element such as a capacitor into a flash lamp. The capacitor is repeatedly charged by a power supply unit (PSU) and discharged into the flash lamp (load). Other similar pulsed-mode power supply applications include laser diode arrays, strobe lights, such as those used for stop-motion photography, and pulsed beacons, such as those used on broadcasting towers, tall buildings, aircraft, etc.

Energy storage capacitors are used to store energy for pulsed load applications. It is undesirable for the power supply to directly provide the pulsed load current, as this would require a larger, heavier supply and draw excessive transient currents from the source of power. Drawing power in such a manner is disliked by utility companies because the high RMS currents result in conduction ($I^2R$) losses, requiring heavier wire, switches and connectors to avoid overheating. A good power factor requires the current waveform to avoid large peaks—that is, to follow the voltage waveform. Regulations are arising which require a good power factor. The RMS current capability of wiring circuit breakers and outlets is limited, and this invention permits a higher output power from a given power source current capacity.

Traditionally, laser power supply manufacturers have measured power factor (PF) into steady-state load conditions, but in reality this does not reflect normal operation. To provide the high peak currents required by a typical flash lamp or laser diode loads, a power supply unit (PSU) charges an energy storage element up to a predetermined energy level, after which the stored energy can be rapidly discharged into a load.

Using an storage capacitor as an example, a power supply unit (PSU) charges the capacitor up to a predetermined level. The energy (E) stored in the capacitor is given by the equation:

$$E=\tfrac{1}{2}CV^2$$

where:
C is the capacitance and
V is the charged voltage).

Typically, when the pulsed load (e.g., flash lamp or laser diode array) is switched on (i.e., when the energy storage element is discharged into the load), the storage capacitor acts as a source of high peak current to drive the load, and discharges rapidly. After each pulsed discharge, the PSU's output voltage regulation control loop senses that the capacitor voltage is low and turns on the PSU fully. The PSU operates at its maximum power until the capacitor reaches a predetermined energy storage level. The PSU then stops charging and "idles" to maintain regulation (full charge), replacing losses, until the next discharge pulse. Factors affecting the available recharge time are line voltage tolerance, pulse energy demanded, pulse repetition rate demanded, capacitance value tolerance and temperature variation tolerances. As a consequence, it is normal for the PSU to draw high current, then idle for a period of time, resulting in an unfavorable (low) PF.

Prior-art PSU designs have generally been directed to charging the energy storage element fast enough to support the maximum output pulse rate (minimum pulse period, or time between subsequent pulses). In doing so, however, input power factor has generally been ignored.

Most capacitor charging power supplies (PSUs) provide a constant current output. The maximum output current is limited by the output circuit and rectifier current ratings. At the start of a charging cycle the output voltage is low, so the instantaneous delivered power (the product of voltage and current) is low. At the end of the charging cycle, the delivered power is very high, typically twice the average charging power. For pulse-forming networks where the capacitor is discharged during each output pulse, this charging ramp of power creates a similar ramp of current draw from the power source, again resulting in poor power factor.

Both active and passive techniques are known in the prior art for improving (correcting) the power factor of electrical devices.

Passive power factor correction techniques smooth the current during each cycle, and since they operate at line frequencies (50–60 cycles per second), they require large, heavy, expensive components and are limited to 0.8 or 0.9 PF. (A "perfect" power factor is 1.0) Further, their fixed values do not readily accommodate the wide range of pulse repetition rates and duty cycles that may be required of a pulsed load.

Active power factor correction techniques attempt to match the cycle-by-cycle current drawn through the input voltage cycle and are therefore incapable of correcting changes in demand occurring over several cycles or fractions of a cycle without large bulk storage capacitors, which increase the size weight, cost and safety hazards.

A practical unity (1.0) power factor is achieved only in the particular case of a steady state load demand where the input current waveform matches the input voltage waveform over a number of cycles at a level that approximates the average power drawn. Another way to express this is that even if each cycle is separately PF-corrected, fluctuations in the power of each individual cycle will cause a greater RMS current value and heating effect than a steady average value of power per cycle.

The challenge in achieving a high power factor is particularly difficult for "pulse mode" power supplies, since in many cases the pulse repetition rate and pulse energy are not fixed, but are user selectable.

A typical example of a prior art method and apparatus for controlling charging of an electrical power storage unit can be found in U.S. Pat. No. 5,726,552, incorporated in its entirety by reference herein. As disclosed therein, "An electric power storage unit consisting of a series combination of capacitor cells. The storage unit is electrically charged with a constant charging current from a charger with a simple structure. If necessary, the simple structure remotely controls the limit voltages of the capacitor cells and varies the capacity and output power of the storage unit according to use conditions. When the terminal voltages reach reference voltages, parallel charging control units bypass the charging current. The parallel charging control units comprise shunt regulators connected in parallel with their respective capacitor cells and acting to bypass the charging current, coupling circuits for connection with a signal source and reference voltage control circuits. The reference voltage control the circuits establish reference voltages according to the output signals from the coupling circuits, compare the terminal voltages of the capacitor cells and control the shunt regulators according to the results of the comparisons. The control units can be digitized using digital signals." (Abstract)

BRIEF DESCRIPTION (SUMMARY) OF THE INVENTION

It is therefore an object of the inventions to provide an improved technique for operating a pulsed-output power supply.

It is another object of the invention to provide an improved technique for efficiently charging an energy storage capacitor while obtaining a high input power factor (PF).

It is another object of the invention to provide a technique for maintaining a high input power factor (PF) in a pulsed-output power supply, and to maintain that high input power factor regardless of the output pulse rate.

It is another object of the invention to provide a technique for dynamically compensating a pulsed-output power supply for changing pulse rates and discharge currents while maintaining a high input power factor.

It is another object of the invention to provide dynamic compensation for environmental factors such as line voltage variation and temperature such that a high input power factor can be maintained over a wide range of variation of those factors.

It is another object of the invention to permit a higher useful output from a power source having limited capability, and to alleviate exceeding the RMS current capability of wiring circuit breakers and outlets.

It is another object of the invention to provide a technique for increasing the effective power output from a power source having a limited capacity.

It is another object of the invention to provide a power supply capable of supplying variable-rate high-energy pulses to a load while simultaneously drawing a nearly constant average power to yield a high (near 1.0) power factor (PF).

According to the invention, the output of a power supply unit (PSU) used to charge an energy storage element such as a capacitor that is periodically discharged is controlled so that advantage can be taken of substantially all the time between capacitor discharges to recharge the capacitor, resulting in reduced output requirements on the PSU and increased input power factor (PF). This technique is useful and advantageous for applications where the capacitor is discharged into a load at regular, as well as irregular or varying intervals.

In an embodiment of the invention, energy transfer from the PSU to the capacitor is sensed by a current sensor or by a "full charge" indicator. The period of current flow to the capacitor is compared to the historical or predicted period between capacitor discharge pulses. The rate of energy transfer from the power supply is automatically adjusted to make these two periods approximately equal. The energy required to charge the capacitor is spread over the time available to minimize the peak current draw from the power source, thus improving the measured power factor.

An output switching means periodically connects a load to the energy storage element, discharging the stored energy into the load. Typically this results in a short-duration, high-current pulse of energy into the load, which is, for example, a laser diode array or flash lamp. The controller monitors the amount of energy stored in the energy storage element by means of the signals provided by the sensing means and controls the output of the power supply unit such that the charging rate between discharges is held to a minimum to achieve regulation (full charge) just prior to the next pulse.

In cases where the discharge rate is changed, the controller adjusts the charging rate so that the charging operation occupies almost the entire time period between pulses. Assuming that the energy storage element is a capacitor, when the charging period (interval) is short, then the charging rate (current) is high. As the charging period becomes longer, the charging current from the PSU to the capacitor is reduced so that the capacitor is charged to the same level, but at a lower rate over the longer charging interval.

According to an aspect of the invention, the controller can be implemented with either analog or digital circuitry. For example, a digital implementation may include a microprocessor and a look-up table. An analog implementation may include capacitors charging over time and an amplifier configured as an integrator.

Expanding upon the principle of power factor correction in pulsed laser systems, one can utilize a microprocessor to implement advanced control. With a microcontroller, any initial conditions can be accommodated based upon a compiled look-up table.

System variables such as repetition (pulse) rate, pulse width, pulse energy and maximum power output can be recorded for a sequence of cases and stored in read-only-memory (ROM). When the user changes any of these, the microcontroller can select the best match within a stored lookup table and generates the initial power setting. As the laser pulses begin, the charging rate is already optimized for a steady power draw between shots. Additionally, the microcontroller continues to monitor the time between "Full charge complete" and initiation of the next pulse. Acting in place of the previous hardware, the intelligent controller minimizes this time necessary to maximize the power factor.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawings. The drawings are intended to be illustrative, not limiting. Although the invention will be described in the context of these preferred embodiments, it should be understood that it is not intended to limit the spirit and scope of the invention to these particular embodiments.

Certain elements in selected ones of the drawings may be illustrated not-to-scale, for illustrative clarity.

Often, similar elements throughout the drawings may be referred to by similar references numerals. For example, the element 199 in a figure (or embodiment) may be similar in many respects to the element 299 in an other figure (or embodiment). Such a relationship, if any, between similar elements in different figures or embodiments will become apparent throughout the specification, including, if applicable, in the claims and abstract.

In some cases, similar elements may be referred to with similar numbers in a single drawing. For example, a plurality of elements 199 may be referred to as 199*a*, 199*b*, 199*c*, etc.

The cross-sectional views, if any, presented herein may be in the form of "slices", or "near-sighted" cross-sectional views, omitting certain background lines which would otherwise be visible in a true cross-sectional view, for illustrative clarity.

The structure, operation, and advantages of the present preferred embodiment of the invention will become further apparent upon consideration of the following description taken in conjunction with the accompanying drawings, wherein:

FIG. 1 is a timing diagram showing charging and discharging waveforms exemplary of the operation of a power supply of the prior art;

FIG. 2 is a generalized block diagram of an embodiment of a power factor-improved power supply, according to the present invention;

FIG. 3A is a timing diagram showing charging and discharging waveforms exemplary of the operation of a the power factorimproved power supply of the present invention; and FIG. 3B is another timing diagram showing charging and discharging waveforms exemplary of the operation of a the power factor-improved power supply of the present invention.

DETAILED DESCRIPTION OF THE INVENTION

FIG. 1 is a timing diagram 100 illustrating the operation of a pulsed-output power supply of the prior art. The X-axis (left-to-right, as viewed) 102 represents time, and the Y-axis (bottom-to-top, as viewed) 104 represents current.

As illustrated in FIG. 1, a storage capacitor (not shown) is periodically discharged, as shown by the current "spikes" (narrow, high-current, discharge pulses) 110, into an intermittently-operated load (not shown, such as a laser flash lamp which requires large, nearly instantaneous amounts of energy. The pulses 110 are of short duration, and typically occur as a sequence of pulses delivered at regularly spaced time intervals ("pulse period") "T1".

As a general proposition, prior art power supplies are typically sized to deliver as much energy to a load, as quickly as possible—in the context of the present invention, to charge (or re-charge) the storage capacitor as quickly as possible to permit operation at the highest possible pulse repetition frequency.

In the example shown in FIG. 1, the storage capacitor is charged (or re-charged) during the time interval ("charge time") labeled "T2", as indicated by the wave forms 120, commencing nearly immediately after a discharge pulse 110, to a predetermined level, typically at a lower instantaneous current (over a longer period of time) than the discharge pulse 110. The charge time T2 is typically less than the pulse period T1, typically significantly less, this leaves a quiescent or "dead" time interval of duration "T3" between the completion of charging and the onset of the next pulse 110 in the series of pulses. In other words, T1≈T2+T3.

When evenly-spaced pulses from the energy storage capacitor are required, for example at regular T1=100 millisecond time intervals, charging the storage capacitor in a much shorter time interval, for example T2=20 milliseconds, by "slamming" (transferring) as much current as quickly as possible into the storage capacitor results in low power factor (PF). In FIG. 1, the charge time T2 is shown as being approximately 50% of the pulse period T1, for illustrative clarity purposes only, and should not be construed as acknowledging that prior art systems utilize 50% (or more) of the pulse interval to charge the storage capacitor.

A Power Factor-Improved Pulsed-Output Power Supply

It has been observed that, when pulsing loads are operated at a power level lower than their maximum, the power factor (PF) decreases. This is because the energy required to recharge the reservoir (storage) capacitor is delivered over a small portion of the operating or mains cycle. Because the recharge energy is supplied over a shorter period of time than is necessary, the power supply draws a high peak current, then idles (low current) until the next discharge. Thus the RMS current is higher than the RMS current could be it were drawn over the complete period between pulse discharges. The present invention reduces the power level of the power supply (or charger) to approximately match the recharge time to the "available" period between recharges. In this manner, the power factor (PF) of the total system with a pulsing load can approach the power factor of the power supply alone driving into a fixed load.

FIG. 2 is a generalized block diagram of an embodiment of a pulsed-output power supply 200 which is power factor-improved according to the techniques of the present invention. The pulsed-output power supply 200 comprises a power supply unit (PSU) 210, which may or may not embody power factor correction, and an energy storage device 220 such as a storage capacitor. In the event that the PSU 210 already has a limited PF correction capability, the present invention will improve upon that existing capability.

Power is supplied to the PSU 210 from a main power source, such as a public utility company and is, for example 110 VAC or 220 VAC at 60 Hz. The output of the PSU 210 on the line 212 is supplied to the storage capacitor 220, which accumulates energy for discharging into and operating a pulsed load 230, such as a laser flash lamp which requires large instantaneous amounts of energy.

Periodically, the energy accumulated in the capacitor 220 is delivered (supplied), via a suitable switch 240 to the load 230. After the capacitor 220 discharges, the switch 240 is caused to be open, disconnecting the load 230 from the capacitor 220, and the capacitor is re-charged (re-supplied with energy) by the PSU 210. The capacitor 220 is repeatedly charged (supplied with energy) in a time interval (T2') between subsequent discharges of accumulated (stored) energy into the load 230.

The switch 240 is suitably a semiconductor switch or switched current device, and is controlled by a controller 250, as indicated by the dashed line 242. One having ordinary skill in the art to which this invention most nearly pertains will readily appreciate that the controller 250 can be implemented with analog or digital circuitry, including an appropriately programmed microcontroller. Alternatively, the switch 240 can be controlled by an external instrumentality, such as an external timer or controller (not shown).

An important feature of the invention is that the output of the PSU 210 can be controlled (i.e., decreased from a maximum rated output) by the controller 250, as indicated by the line 252 extending between the controller 250 and the PSU 210. In a general sense, the controller 250 can control how energy is delivered by the PSU 210 to the energy storage device (capacitor) 220, including controlling both the voltage and current output by the PSU 210. Optionally, another switch (not shown) can be disposed in the line 212 between the PSU 210 and the capacitor 220 so that when the switch 240 is closed, energy is temporarily not supplied to the capacitor (in other words, the load 230 is never directly across the output of the PSU 210). Or, a similar result can be obtained simply by inhibiting operation of the PSU during discharge of the capacitor 220 (i.e., when the switch 240 is closed.)

According to the invention, the charging (or re-charging) and discharging of the capacitor 220 is monitored, such as with an appropriate sensing means 260 interposed in the line 212 between the PSU 210 and the capacitor 220 (as illustrated) or, alteratively, between the switch 240 and the load 230. The sensing means 260 may simply be a current monitor, or the output of a voltage comparator/error amplifier indicating when regulation (full charge) is reached. In this manner, the energy transfer between the PSU 210 and the capacitor 220 can be monitored at all times including, more particularly, during a time interval or "pulse period" (T1') between discharges. The charge state of the capacitor 220 can also readily be detected by the sensing means 260. The sensing means 260 can measure the charge time T2' to the point of regulation by making a voltage measurement and comparing the voltage to a reference to provide a "charge complete" signal.

A signal indicative of the energy being delivered by the PSU 210 to the capacitor 220 is provided on a line 262 to the controller 250, and can be used to control (i.e., decrease from a maximum rated output) the output of the PSU 210 so as to advantageously control the rate at which the capacitor 220 is charged so as to advantageously utilize substantially the entire pulse period (T1'). In other words, the ratio T2':T1' is set as close to unity as possible by dynamically adjusting the PSU power delivery rate. Experimental results have verified this, demonstrating an improvement in power factor from 0.51 to 0.92.

The controller 250 is suitably implemented as a digital controller, suitably programmed to achieve the described results. For example, a look-up table associated with the controller can store multi-dimensional data regarding charge rates, discharge rates, pulse periods, characteristics of the capacitor and PSU, and the like, to control the operation of the PSU according to preset recipes. Alternatively, algorithms can be implemented to control the operation of the PSU. Additionally, user inputs can be provided to set initial or nominal operating characteristics of the load device 230. Additionally, line voltage variations can be monitored so that the controller can "anticipate" and compensate for effects of line voltage variations on input power factor. One having ordinary skill in the art to which the present invention most nearly pertains will understand how to implement a desired controller based on the description set forth herein.

The controller 250 is also suitably implemented as an analog circuit, in which case the charging current and output pulse currents are readily converted to analog voltages, such as by charging a capacitor then, by comparing a voltage representing for example 95% of the pulse period (T1) to a voltage representing the charge time (T2), an error signal may be generated using an amplifier configured as an integrator. The error signal developed in this manner would be used to control the power delivery rate of the PSU to balance the inputs being compared. A disadvantage of such an analog embodiment of the controller is that it uses "historical" information which is "smoothed" by the integrator, whereas it is easier to "predict" the power demand with the digital embodiment. Nevertheless, such an analog controller can find useful application in a number of situations, and is readily implemented by one having ordinary skill in the art to which the present invention most nearly pertains based on the teachings set forth herein.

FIG. 3A is a timing diagram 300 (compare 100) illustrating the operation of the pulsed-output power supply (200) of the present invention. The X-axis (left-to-right, as viewed, compare 102) 302 represents time, and the Y-axis (bottom-to-top, as viewed, compare 104) 304 represents current.

As illustrated in FIG. 3A, the storage capacitor (220) is periodically discharged, as shown by the current "spikes" (pulses) 310 (compare 110), into the load device (230), periodically at time intervals (pulse period) "T1" (compare T1).

In the example shown in FIG. 3A, the storage capacitor is charged (or re-charged) during the time interval (charge interval) labeled "T2'" (compare T2), as indicated by the wave forms 320 (compare 120), commencing nearly immediately after a discharge pulse 310. As in the example of FIG. 1, there is a dead time "T3'" between the completion of charging and the onset of the next pulse 110 in the series of pulses. In other words, T1'≈T2'+T3'.

In this example, wherein the discharge pulses are evenly spaced, for example at T1'=100 millisecond intervals, charging the storage capacitor 220 in generally as long a time interval as possible, for example T2'=95 milliseconds will result in an improved input power factor. The overall amount of time available to be utilized for recharging the storage capacitor 220 is nearly the entire pulse period less, of course, the short finite duration of the pulse. For example, the pulse period T1' may be 100 milliseconds, and the pulse duration may be 1–2 milliseconds, resulting in an overall interval between pulses, available for recharging the storage capacitor 220, of 98–99 milliseconds.

In FIG. 3A, the charge time T2' is shown as being approximately 95% of the pulse period T1', for illustrative clarity. It is specifically contemplated that the present invention includes utilizing greater than 50% of the available time interval T1' between pulses to charge the storage capacitor, including:

at least 50% of the pulse period (T2'≧0.50 T1');

at least 60% of the pulse period (T2'≧0.60 T1');

at least 70% of the pulse period (T2'≧0.70 T1');

at least 80% of the pulse period (T2'≧0.80 T1');

at least 90% of the pulse period (T2'≧0.90 T1');

at least 95% of the pulse period (T2'≧0.95 T1');

An upper limit for the charge time T2' would be the pulse period less the pulse duration, as described above, plus a prudent margin, such as 1% of the pulse period, for settling time and potential errors and fluctuations. Thus, it is envisioned that the longest charge time would likely be no greater than approximately 97% of the pulse period.

It should clearly be understood, however, that the present invention has utility in instances when T2'<0.50 T1. For example, if the PSU (210) has a limited dynamic range, and if low power levels are required, T2' can drop below 50% of T1', in which case the method of the present invention will still have reduced the input currents and improved the power factor significantly.

A side-by-side comparison of FIGS. 3A and 1 also illustrates that the charging current (320 versus 120) can be reduced as a result of increasing the charge time. This is a desirable result, as the demand on the PSU 210 is less.

It should be understood that although the waveforms 320 are shown as square waves, and as being representative of a constant current, the overall energy (i.e., any combination of voltage and current) being delivered by the PSU 210 to the storage capacitor 220 during the charge time T2' can be "profiled" in any desired manner by controlling voltage and/or current to take full advantage of the charging characteristics of the storage capacitor, including delivering energy at a constant rate over the charge time T2'.

FIG. 3B is a timing diagram 350 (compare 300) illustrating the operation of the pulsed-output power supply (200) of the present invention, and is illustrative of instances wherein the output pulses are of irregular (uneven) duration,. The X-axis (left-to-right, as viewed, compare 302) 352 represents time, and the Y-axis (bottom-to-top, as viewed, compare 304) 354 represents current.

As illustrated in FIG. 3B, the storage capacitor (220) is periodically discharged, as shown by the current "spikes" (pulses) 310a, 310b, 310c, 310d and 310e (compare 310), into the load device (230), periodically at time intervals (pulse period) "T1"" (compare T1'). In this example, as in the example illustrated in FIG. 3A, the storage capacitor (220) is charged (or re-charged) during the time interval (charge interval) labeled "T2"" (compare T2'), as indicated by the wave forms 340a, 340b, 340c, 340d and 340e, each charge interval 340a . . . 340e (compare 320) preceding a corresponding one of the sequence of output pulses 310a . . . 310e and nearly immediately after a previous discharge pulse.

In this example, the discharge pulses 310a . . . 310e are not all evenly spaced. Rather, the pulse 310a commences after the charge interval 340a and follows a previous pulse (not shown) by a first pulse time;

the pulse 310b commences after the charge interval 340b, and follows the pulse 310a by a second pulse time T1" 330b which is shown as being equal to the first pulse time T1" 330a;

the pulse 310c commences after the charge interval 340c, and follows the pulse 310b by a third pulse time T1" 330c which is also shown as being equal to the second pulse time T1" 330b;

the pulse 310d commences after the charge interval 340d, and follows the pulse 310c by a fourth pulse time T1" 330d which is shown as being of less duration than the third pulse time T1" 330c; and the pulse 310e commences after the charge interval 340e, and follows the pulse 310d by a fifth pulse time T1" 330e which is shown as being of less duration than the fourth pulse time T1" 330d.

Of note in the timing diagram of FIG. 3B is that the charging current represented by the waveforms 340b and 340c are at a first level preceding the evenly-spaced pulses 310a and 310b (i.e., during the similar pulse times 330a and 330b). During a shorter pulse interval 330c, the charging current represented by the waveform 340d preceding the pulse 310d is at a higher level. During a yet shorter pulse interval 330d, the charging current represented by the waveform 340e preceding the pulse 310e is at a yet higher level. In this manner, comparable amounts of energy can be provided by the PSU to the capacitor in virtually any duration charge interval, while maintaining a high input power factor.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. In a system comprising an energy storage capacitor, means for periodically discharging the energy storage capacitor into a load, and a power supply for re-supplying energy to the energy storage capacitor between discharges, a method of controlling re-supplying energy to the energy storage capacitor comprising:

determining a time interval between subsequent discharges of the energy storage element; and regulating the energy output of the power supply to re-supply energy to the energy storage capacitor over substantially the entire interval between subsequent discharges of the energy storage element.

2. A method, according to claim 1, wherein:

the energy storage capacitor is a capacitor.

3. A method, according to claim 2, wherein:

the capacitor is discharged into a load selected from the group consisting of flash lamp, laser system, laser diode, strobe light, and pulsed beacon.

4. A method, according to claim 1, wherein:

there is a first time interval (T1') between subsequent discharges of the energy storage element; and the energy is provided to the energy storage capacitor over a second time interval (T2') which is at least 50% of the first time interval.

5. A method, according to claim 4, wherein:

the second time interval is at least 60% of the first time interval.

6. A method, according to claim 4, wherein:

the second time interval is at least 70% of the first time interval.

7. A method, according to claim 4, wherein:

the second time interval is at least 80% of the first time interval.

8. A method, according to claim 4, wherein:

the second time interval is at least 90% of the first time interval.

9. A method, according to claim 4, wherein:

the second time interval is at least 95% of the first time interval.

10. A method, according to claim 4, wherein:

the second time interval is no greater than 97% of the first time interval.

11. A pulsed-output power supply, comprising:

an energy storage element;

a power supply unit (PSU) providing a source of energy for charging the energy storage element;

sensing means for sensing the rate at which the power supply charges the energy storage capacitor and the amount of energy stored therein, and providing one or more signals indicative thereof;

a controller responsive to the one or more signals from the sensing means for adjusting the rate at which the power supply unit provides energy to the energy storage element; and output switching means for discharging the energy storage capacitor into a load.

12. A pulsed-output power supply according to claim 11, wherein:

said output switching means is activated at a substantially constant periodic rate to discharge the energy storage capacitor into the load; and said controller adjusts the rate at which the power supply unit provides energy to the energy storage capacitor such that the rate of energy transfer from the power supply unit to the energy storage capacitor is essentially constant.

13. A pulsed-output power supply according to claim 11, further comprising:

a source of input power to the power supply unit;

said controller adjusts the rate at which the power supply unit provides energy to the energy storage capacitor such that power is supplied to the power supply unit by said source of input power at a rate which is substantially constant.

14. A pulsed-output power supply according to claim 11, wherein:

the load is a laser.

15. A pulsed-output power supply according to claim 14, wherein:

said output switching means is activated at a substantially constant periodic rate to discharge the energy storage capacitor into the load; and said controller adjusts the rate at which the power supply unit provides energy to the energy storage capacitor such that the rate of energy transfer from the power supply unit to the energy storage capacitor is essentially constant.

16. A pulsed-output power supply according to claim 15, further comprising:

a source of input power to the power supply unit;

said controller adjusts the rate at which the power supply unit provides energy to the energy storage capacitor such that power is supplied to the power supply unit by said source of input power at a rate which is substantially constant.

17. Method of re-charging a storage capacitor between discharges, said storage capacitor being periodically discharged into a load, comprising:

providing a power supply having an adjustable output;

adjusting the output of the power supply in response to the charging period.

18. Method, according to claim 17, further comprising:

re-charging the storage capacitor over substantially an entire period between discharges, thereby increasing the input power factor of the power supply.

* * * * *